US011968511B2

(12) United States Patent
Zhao et al.

(10) Patent No.: US 11,968,511 B2
(45) Date of Patent: Apr. 23, 2024

(54) LOUDSPEAKER AND LOUDSPEAKER DEVICE

(71) Applicant: GOERTEK INC., Weifang (CN)

(72) Inventors: Kekang Zhao, Weifang (CN); Qing Yang, Weifang (CN)

(73) Assignee: GOERTEK INC., Weifang (CN)

(*) Notice: Subject to any disclaimer, the term of this patent is extended or adjusted under 35 U.S.C. 154(b) by 393 days.

(21) Appl. No.: 17/395,687

(22) Filed: Aug. 6, 2021

(65) Prior Publication Data

US 2021/0368273 A1 Nov. 25, 2021

Related U.S. Application Data

(63) Continuation of application No. PCT/CN2020/081920, filed on Mar. 28, 2020.

(30) Foreign Application Priority Data

Nov. 22, 2019 (CN) .......................... 2019111602661

(51) Int. Cl.
*H04R 9/02* (2006.01)

(52) U.S. Cl.
CPC .................................... *H04R 9/025* (2013.01)

(58) Field of Classification Search
CPC ........... H04R 9/025; H04R 9/00; H04R 9/063
USPC ................................ 381/332, 401, 412, 421
See application file for complete search history.

(56) References Cited

U.S. PATENT DOCUMENTS

| | | | | |
|---|---|---|---|---|
| 4,472,605 A | 9/1984 | Klein | | |
| 2009/0136065 A1* | 5/2009 | Yano | H04R 9/10 381/186 | |
| 2010/0166201 A1* | 7/2010 | Shim | H04R 9/02 381/71.1 | |

(Continued)

FOREIGN PATENT DOCUMENTS

| | | |
|---|---|---|
| CN | 101361402 A | 2/2009 |
| CN | 201260241 Y | 6/2009 |
| CN | 102821342 A | 12/2012 |

(Continued)

OTHER PUBLICATIONS

International Search Report and Written Opinion issued in corresponding International Application No. PCT/CN2020/081920; dated Jul. 28, 2020, 12 pgs.

(Continued)

*Primary Examiner* — George C Monikang
(74) *Attorney, Agent, or Firm* — HAUPTMAN HAM, LLP

(57) ABSTRACT

This disclosure provides a loudspeaker, including a first basket; a second basket; a cone paper enclosing an accommodating cavity with openings at both ends, the openings at both ends of the cone paper being respectively provided with the first basket and the second basket; a magnetic circuit structure located in the accommodating cavity; and a voice coil assembly located in the accommodating cavity, installed between the magnetic circuit structure and an inner wall of the accommodating cavity of the cone paper, and connected to the inner wall of the accommodating cavity of the cone paper, the voice coil assembly being configured to move under an action of a magnetic field of the magnetic circuit structure to drive the cone paper to vibrate. This disclosure further provides a loudspeaker device.

19 Claims, 8 Drawing Sheets

(56) References Cited

U.S. PATENT DOCUMENTS

| | | | | |
|---|---|---|---|---|
| 2016/0234601 | A1 | 8/2016 | Yuasa et al. | |
| 2020/0045451 | A1* | 2/2020 | Zhang ...................... | H04R 9/06 |

FOREIGN PATENT DOCUMENTS

| | | | |
|---|---|---|---|
| CN | 205793302 | U | 12/2016 |
| CN | 208956327 | U | 6/2019 |

OTHER PUBLICATIONS

First Office Action issued in corresponding Chinese Application No. 201911160266.1; dated Sep. 29, 2020; State Intellectual Property Office of the P.R. China, Beijing, China, 13 pgs.

* cited by examiner

LOUDSPEAKER AND LOUDSPEAKER DEVICE

CROSS REFERENCE TO RELATED APPLICATIONS

This disclosure is a Continuation Application of International Application No. PCT/CN2020/081920, filed on Mar. 28, 2020, which claims the priority to Chinese Patent Application No. 201911160266.1, entitled "LOUDSPEAKER AND LOUDSPEAKER DEVICE", submitted to the China National Intellectual Property Administration on Nov. 22, 2019, which is hereby incorporated by reference in its entirety.

TECHNICAL FIELD

This disclosure relates to the technical field of acoustics, in particular to a loudspeaker and a loudspeaker device.

BACKGROUND

As consumers have increasingly higher requirements for loudspeakers, circumferential non-directional loudspeakers are increasingly favored by consumers. Circumferential non-directional loudspeakers generally use reflective cones to radiate sound waves to the circumferential direction, but this method will attenuate high-frequency sound waves.

SUMMARY

The main object of this disclosure is to provide a loudspeaker and a loudspeaker device, aiming to solve the technical problem of attenuating high-audio sound waves by using a reflection cone to radiate sound waves in the circumferential direction.

In order to achieve the above object, this disclosure provides a loudspeaker, which includes:

a first basket;

a second basket;

a cone paper enclosing an accommodating cavity with openings at both ends, the openings at both ends of the cone paper being respectively provided with the first basket and the second basket;

a magnetic circuit structure located in the accommodating cavity; and a voice coil assembly located in the accommodating cavity, installed between the magnetic circuit structure and an inner wall of the accommodating cavity of the cone paper, and connected to the inner wall of the accommodating cavity of the cone paper, the voice coil assembly being configured to move under an action of a magnetic field of the magnetic circuit structure to drive the cone paper to vibrate.

Optionally, the voice coil assembly includes:

a first voice coil; and a second voice coil; where:

the first voice coil and the second voice coil are arranged between the openings at both ends of the accommodating cavity and are connected by winding, and windings of the first voice coil and the second voice coil are wound in opposite directions.

Optionally, a bobbin of the first voice coil and a bobbin of the second voice coil are connected to an inner wall of the cone paper.

Optionally, the magnetic circuit structure includes:

a first magnet;

a first washer; and a second magnet; where:

the first magnet, the first washer, and the second magnet are sequentially arranged in a direction of the first basket toward the second basket to form the magnetic circuit structure.

Optionally, the magnetic circuit structure further includes:

a second washer; and a third magnet; where:

the second washer and the third magnet are sequentially arranged between the second magnet and the second basket.

Optionally, the first voice coil is disposed between the first washer and the inner wall of the accommodating cavity of the cone paper, and the second voice coil is disposed between the second washer and the inner wall of the accommodating cavity of the cone paper.

Optionally, the cone paper includes:

a first wrapping surface; and a second wrapping surface; where:

the first wrapping surface and the second wrapping surface are wound to form the accommodating cavity, and the first wrapping surface and the second wrapping surface are connected by an elastic edge.

Optionally, a circumference of an outer surface of the cone paper is configured to decrease from the openings at both ends to a middle position of the cone paper.

Optionally, the cone paper has a cylindrical shape or a rectangular tube type.

In order to achieve the above object, this disclosure further provides a loudspeaker device, which includes a housing and the above-mentioned loudspeaker arranged on the housing.

The loudspeaker in the embodiment of this disclosure includes a first basket, a second basket, a cone paper, a magnetic circuit structure, and a voice coil assembly. The cone paper encloses an accommodating cavity with openings at both ends, and the openings at both ends of the cone paper are respectively provided with the first basket and the second basket; the magnetic circuit structure and the voice coil assembly are located in the accommodating cavity; the voice coil assembly is installed between the magnetic circuit structure and an inner wall of the accommodating cavity of the cone paper, and connected to the inner wall of the accommodating cavity of the cone paper; the voice coil assembly is configured to move under an action of a magnetic field of the magnetic circuit structure to drive the cone paper to vibrate. The cone paper of the loudspeaker is wrapped around the circumferential direction of the voice coil assembly and the magnetic circuit structure. The cone paper vibrates as a whole to realize the circumferential non-directional radiation of sound, which has a simple structure, and does not affect high-frequency sound waves.

BRIEF DESCRIPTION OF THE DRAWINGS

In order to more clearly explain the embodiments of this disclosure or the technical solutions in the related art, the drawings used in the description of the embodiments or the related art will be briefly introduced below. Obviously, the drawings in the following description are merely part of the drawings of this disclosure. For those of ordinary skill in the art, other drawings can be obtained based on these drawings without paying creative work.

Figure 1:
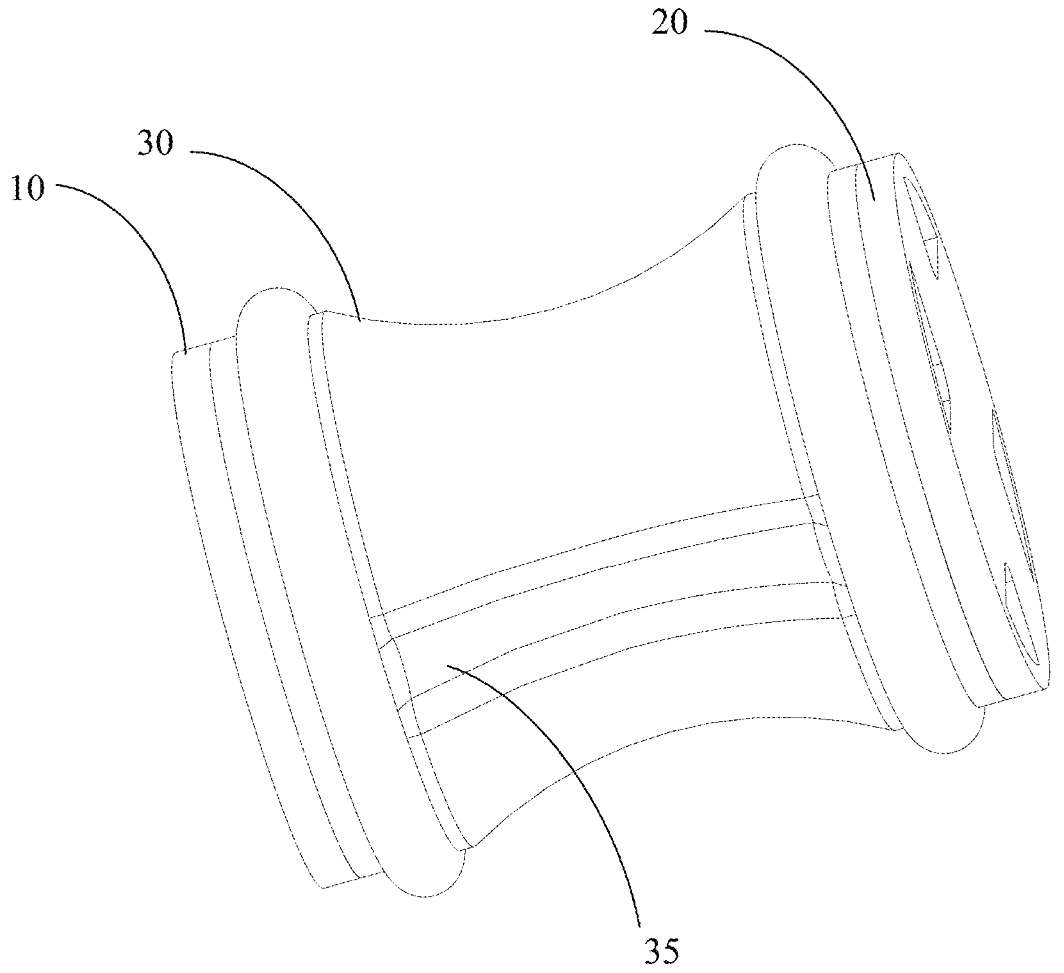
FIG. 1 is a schematic structural diagram of a loudspeaker according to an embodiment of this disclosure.
Figure 2:
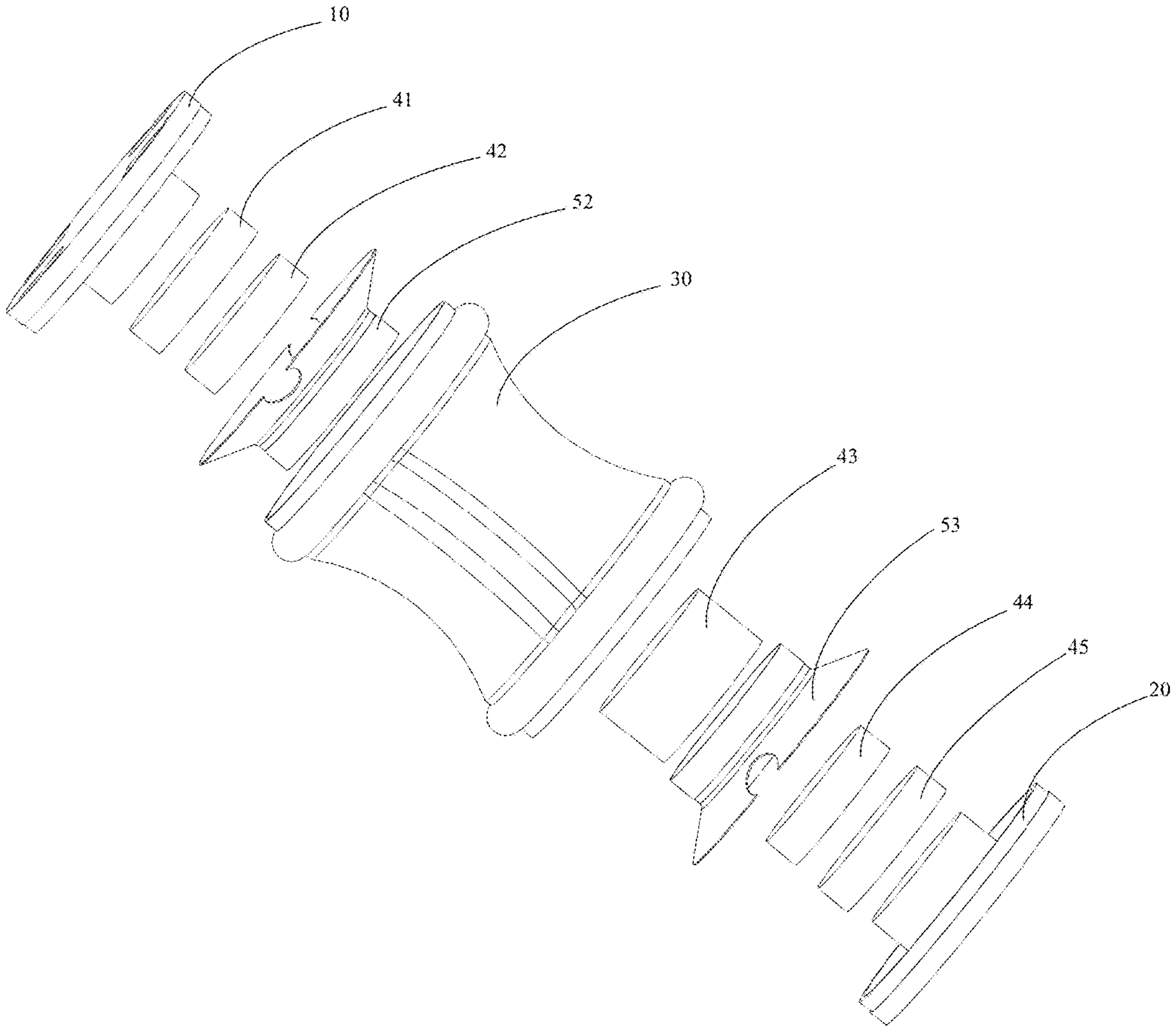
FIG. 2 is a schematic exploded structural diagram of the loudspeaker according to an embodiment of this disclosure.

The realization of the objects, functional characteristics and advantages of this disclosure will be further described in conjunction with the embodiments and with reference to the drawings.

DETAILED DESCRIPTION OF THE EMBODIMENTS

In the following, the technical solutions in the embodiments of this disclosure will be clearly and completely described with reference to the drawings in the embodiments of this disclosure. Obviously, the described embodiments are only a part of the embodiments of this disclosure, and not all of the embodiments. Based on the embodiments of this disclosure, all other embodiments obtained by those of ordinary skill in the art without creative efforts shall fall within the claimed scope of this disclosure.

It should be noted that all directional indicators (such as up, down, left, right, front, back, etc.) in the embodiments of this disclosure are only used to explain the relative positional relationship, movement situation, etc. between components in a specific posture (as shown in the drawings). If the specific posture changes, the directional indication also changes accordingly.

In addition, the descriptions related to “first”, “second”, and the like in this disclosure are for descriptive purposes only, and cannot be understood as indicating or implying their relative importance or implicitly indicating the number of technical features indicated. Therefore, a features associated with “first” and “second” may explicitly or implicitly include at least one of such feature. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, nor within the protection scope of this disclosure.

This disclosure provides a loudspeaker, which is applied in a loudspeaker device and is a sound-emitting component of the loudspeaker device. The loudspeaker may be circular or square, and is specifically arranged according to requirements. The following is an example of a loudspeaker with a circular structure.

In an embodiment, referring to FIGS. 1 to 4, the loudspeaker 1 in the embodiment of this disclosure includes: a first basket 10, a second basket 20, a cone paper 30, a magnetic circuit structure 40, and a voice coil assembly 50. The first basket 10, the cone paper 30, and the second basket 20 are combined to enclose a mounting cavity, and the mounting cavity is configured to accommodate the magnetic circuit structure 40 and the voice coil assembly 50.

Specifically, the cone paper 30 is configured to enclose an accommodating cavity 32 with openings 31 at both ends, and the openings 31 at both ends of the cone paper 30 are respectively provided with the first basket 10 and the second basket 20. That is, the openings 31 at both ends of the cone paper 30 are respectively mounted with the first basket 10 and the second basket 20, and the first basket 10, the cone paper 30 and the second basket 20 are assembled to form the mounting cavity.

The magnetic circuit structure 40 and the voice coil assembly 50 are both located in the accommodating cavity 32. The voice coil assembly 50 is installed between the magnetic circuit structure 40 and an inner wall of the accommodating cavity 32 of the cone paper 30, and the voice coil assembly 50 is connected to the inner wall of the accommodating cavity 32 of the cone paper 30. The voice coil assembly 50 is configured to move under an action of a magnetic field of the magnetic circuit structure 40 to drive the cone paper 30 to vibrate.

The magnetic circuit structure 40 is disposed in the accommodating cavity 32. A magnetic field is formed in the accommodating cavity 32. The voice coil assembly 50 is movably disposed in the accommodating cavity 32. The voice coil assembly 50 includes a first voice coil 52 and a second voice coil 53, the first voice coil 52 and the second voice coil 53 are connected by winding, and windings of the first voice coil 52 and the second voice coil 53 are wound in opposite directions. One end of a bobbin 51 of the first voice coil 52 and one end of a bobbin 51 of the second voice coil 53 are connected to an inner wall of the cone paper 30, so that the voice coil assembly 50 is suspended in the accommodating cavity 32. The material of the bobbin 51 is iron, and when the first voice coil 52 and the second voice coil 53 are energized, the voice coil assembly 50 generates an attract and repel phenomenon with the magnetic circuit structure 40 under an action of a magnetic field formed by the magnetic circuit structure 40, so the first voice coil 52 and the second voice coil 53 move in opposite directions, namely, the first voice coil 52 and the second voice coil 53 move toward or away from each other. Because the voice coil assembly 50 is connected to the cone paper 30, when the voice coil assembly 50 moves, the cone paper 30 is driven to vibrate, and the cone paper 30 vibrates the surrounding air to cause sound, so that the loudspeaker 1 emits sound in this way. Because the cone paper 30 wraps around an accommodating cavity 32, and the magnetic circuit structure 40 and the voice coil assembly 50 are arranged in the accommodating cavity 32, when the voice coil assembly 50 moves to drive the cone paper 30 to vibrate, the cone paper 30 vibrates as a whole and vibrates in a circumferential direction of the voice coil assembly 50, so as to drive the circumferential air vibration of the voice coil assembly 50. As a result, sound can be radiated from the circumferential direction of the voice coil assembly 50 without directivity. Since the voice coil assembly 50 directly drives the cone paper 30 to vibrate, there is no need for the reflective cones to radiate sound, and the attenuation of high-frequency sound waves is avoided.

Figure 6:
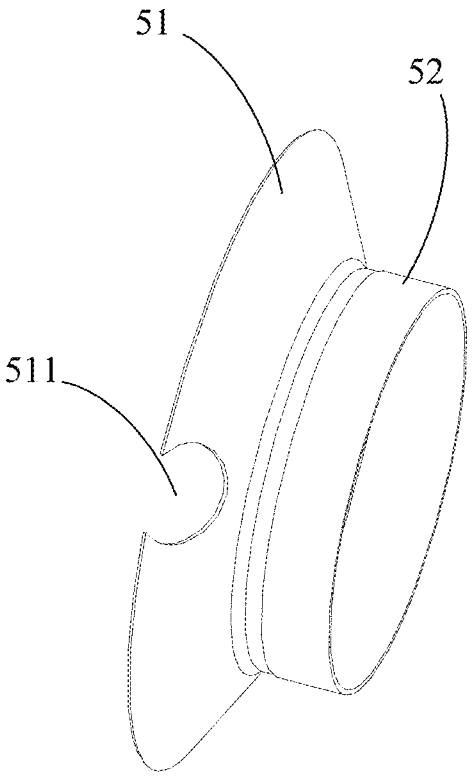
FIG. 6 is a schematic structural diagram of a first voice coil or a second voice coil of the loudspeaker according to this disclosure.

Further, the voice coil assembly 50 is bonded to the cone paper 30. Specifically, referring to FIGS. 4 and 6, an engaging slot 511 is provided on one end of the bobbin 51 connected to the cone paper 30, and the engaging slot 511 is engaged into a protrusion of the cone paper 30 and bonded to the protrusion, so as to drive the cone paper 30 to vibrate.

The loudspeaker 1 in the embodiment of this disclosure includes a first basket 10, a second basket 20, a cone paper 30, a magnetic circuit structure 40, and a voice coil assembly 50. The cone paper 30 encloses an accommodating cavity 32 with openings 31 at both ends, and the openings 31 at both ends of the cone paper 30 are respectively provided with the first basket 10 and the second basket 20. The magnetic circuit structure 40 and the voice coil assembly 50 are located in the accommodating cavity 32. The voice coil assembly 50 is installed between the magnetic circuit structure 40 and an inner wall of the accommodating cavity 32 of the cone paper 30, and the voice coil assembly 50 is connected to the inner wall of the accommodating cavity 32 of the cone paper 30. The voice coil assembly 50 is configured to move under an action of a magnetic field of the magnetic circuit structure 40 to drive the cone paper 30 to vibrate. The cone paper 30 is wrapped around the circumferential direction of the voice coil assembly 50 and the magnetic circuit structure 40. The cone paper 30 vibrates as a whole to realize the circumferential non-directional radiation of sound, which has a simple structure, and does not affect high-frequency sound waves.

Figure 3:
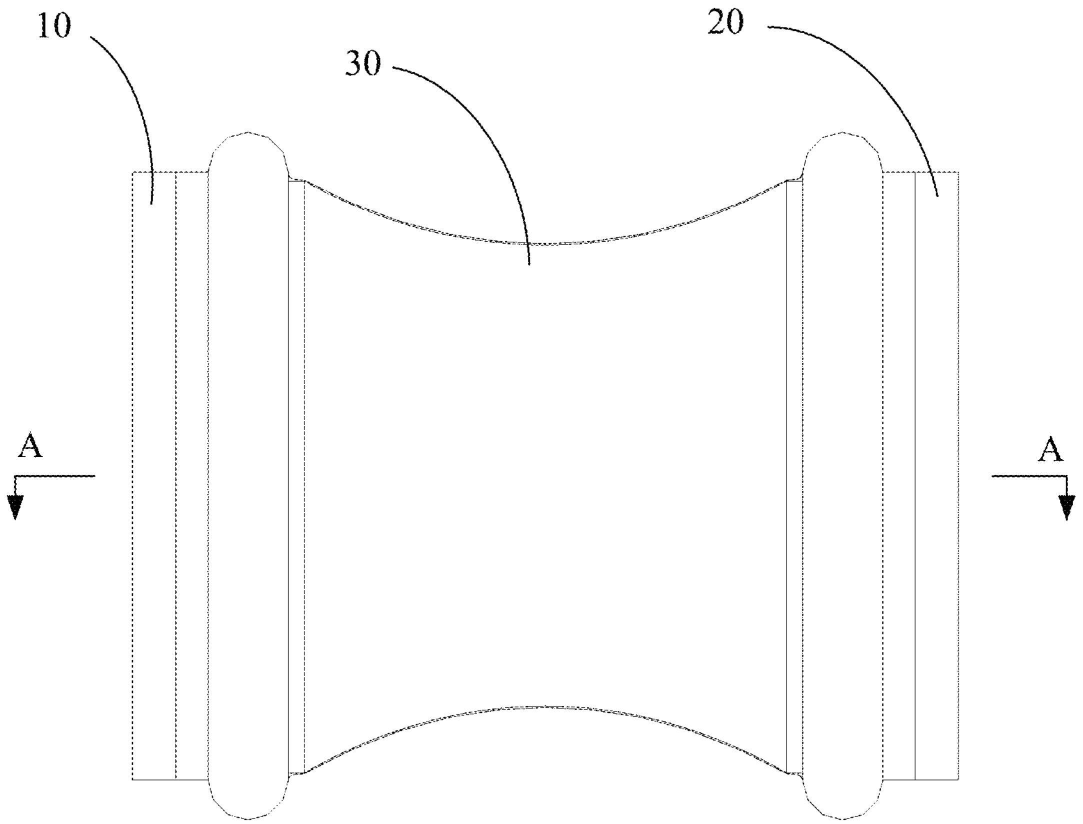
FIG. 3 is a schematic front view of the loudspeaker according to an embodiment of this disclosure.
Figure 4:
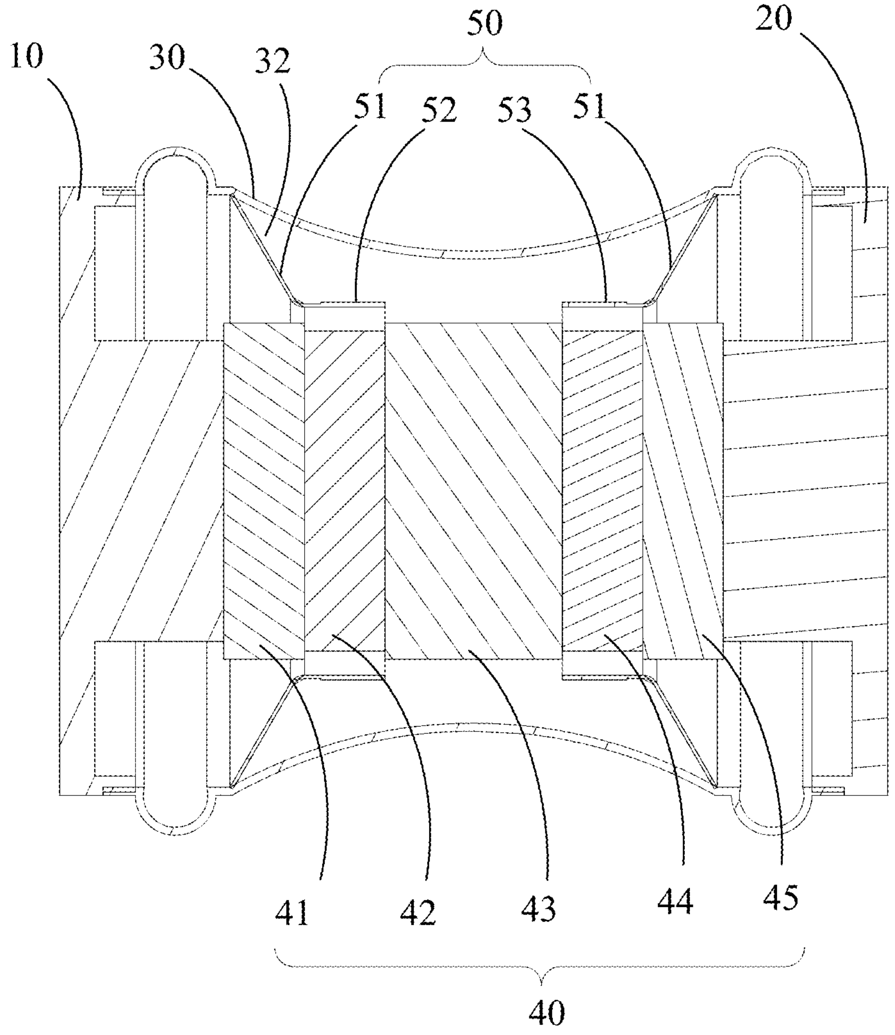
FIG. 4 is a schematic cross-sectional view along A-A in FIG. 3.

When the voice coil assembly 50 includes two voice coils, that is, when the voice coil assembly 50 includes the first voice coil 52 and the second voice coil 53, specifically, referring to FIGS. 3 and 4, the first voice coil 52 is installed between a first washer 42 and the inner wall of the accommodating cavity 32 of the cone paper 30, the second voice coil 53 is installed between a second washer 44 and the inner wall of the accommodating cavity 32 of the cone paper 30, the first voice coil 52 and the second voice coil 53 are connected by winding, and windings of the first voice coil 52 and the second voice coil 53 are wound in opposite directions.

That is, the voice coil assembly 50 includes two voice coils, namely, the first voice coil 52 and the second voice coil 53. The first voice coil 52 and the second voice coil 53 are coaxially arranged and wound by a same winding. The first voice coil 52 and the second voice coil 53 are connected by the winding, and the winding directions of the first voice coil 52 and the second voice coil 53 are opposite, so that when the first voice coil 52 and the second voice coil 53 are energized, the first voice coil 52 and the second voice coil 53 move in the opposite directions due to the opposite winding direction. When the first voice coil 52 and the second voice coil 53 move in a direction away from each other, that is, move in the directions close to the openings 31, the cone paper 30 is driven to stretch outward, and the cone paper 30 contracts in the direction of the accommodating cavity 32. When the first voice coil 52 and the second voice coil 53 move in a direction facing each other, that is, move in the directions away from the openings 31 and close to a center of the cone paper 30, the cone paper 30 is driven to push inward, and the cone paper 30 expands in the direction of the accommodating cavity 32.

The cone paper 30 vibrates when the voice coil assembly 50 moves back and forth. The vibration frequency of the cone paper 30 is controlled by controlling the movement frequency of the voice coil assembly 50, so as to radiate different sounds. In this embodiment, the first voice coil 52 and the second voice coil 53 moves away from or facing each other, so as to drive the cone paper 30 to vibrate. In addition, since the first voice coil 52 and the second voice coil 53 drive the same cone paper 30 to vibrate, it is ensured that the vibration frequencies of each position of the cone paper 30 are the same, thus avoiding the influence on the audio and improving the sound quality.

It should be noted that the loudspeaker 1 in this embodiment may also include two or more voice coil assemblies 50, and the voice coil assemblies 50 are axially arranged and symmetrically distributed, such as four groups of voice coil assemblies 50, in which two groups are symmetrically distributed with the other two groups, and the two groups of voice coil assemblies 50 on the same side are wound the same.

In the embodiment of this disclosure, the magnetic circuit structure 40 includes but is not limited to the following structures. For example, in an embodiment, the magnetic circuit structure 40 includes a first magnet 41, a first washer 42, and a second magnet 43. The first magnet 41, the first washer 42, and the second magnet 43 are sequentially arranged in a direction of the first basket 10 toward the second basket 20 to form the magnetic circuit structure 40.

In a further embodiment, the magnetic circuit structure 40 further includes a second washer 44 and a third magnet 45. The second washer 44 and the third magnet 45 are sequentially arranged between the second magnet 43 and the second basket 20 to form the magnetic circuit structure 40.

The first basket 10, the first magnet 41, the first washer 42, the second magnet 43, and the second basket 20 are sequentially arranged to form a magnetic circuit. The first voice coil 52 is installed in a circumferential direction of the first washer 42 to cut a magnetic field generated by the first magnet 41 and the second magnet 43. The second voice coil 53 is installed in a circumferential direction of the second washer 44 to cut a magnetic field generated by the third magnet 45 and the second magnet 43. The magnetic field directions of the first magnet 41 and the third magnet 45 are opposite, and when the voice coil assembly 50 is energized, the first voice coil 52 and the second voice coil 53 cut the magnetic induction lines and move in opposite directions because the winding directions of the first voice coil 52 and the second voice coil 53 are opposite. In this embodiment, the magnetic circuit structure 40 is applied to a loudspeaker 1 having two voice coil assemblies 50. A first voice coil 52 and a second voice coil 53 are respectively arranged in the circumferential directions of the first washer 42 and the second washer 44. The first magnet 41, the first washer 42 and the second magnet 43 form a magnetic circuit surrounded by the first voice coil 52, and the second magnet 43, the second washer 44, and the third magnet 45 form a magnetic circuit surrounded by the second voice coil 53, so that the magnetic fields where the first voice coil 52 and the second voice coil 53 are located are uniform. Therefore, the magnetic field forces acting on the two voice coil assemblies 50 are uniform, and the movement amplitude of the first voice coil 52 and the second voice coil 53 is uniform, so that the cone paper is vibrated evenly, thereby improving the sound effect of loudspeaker 1.

Figure 5:
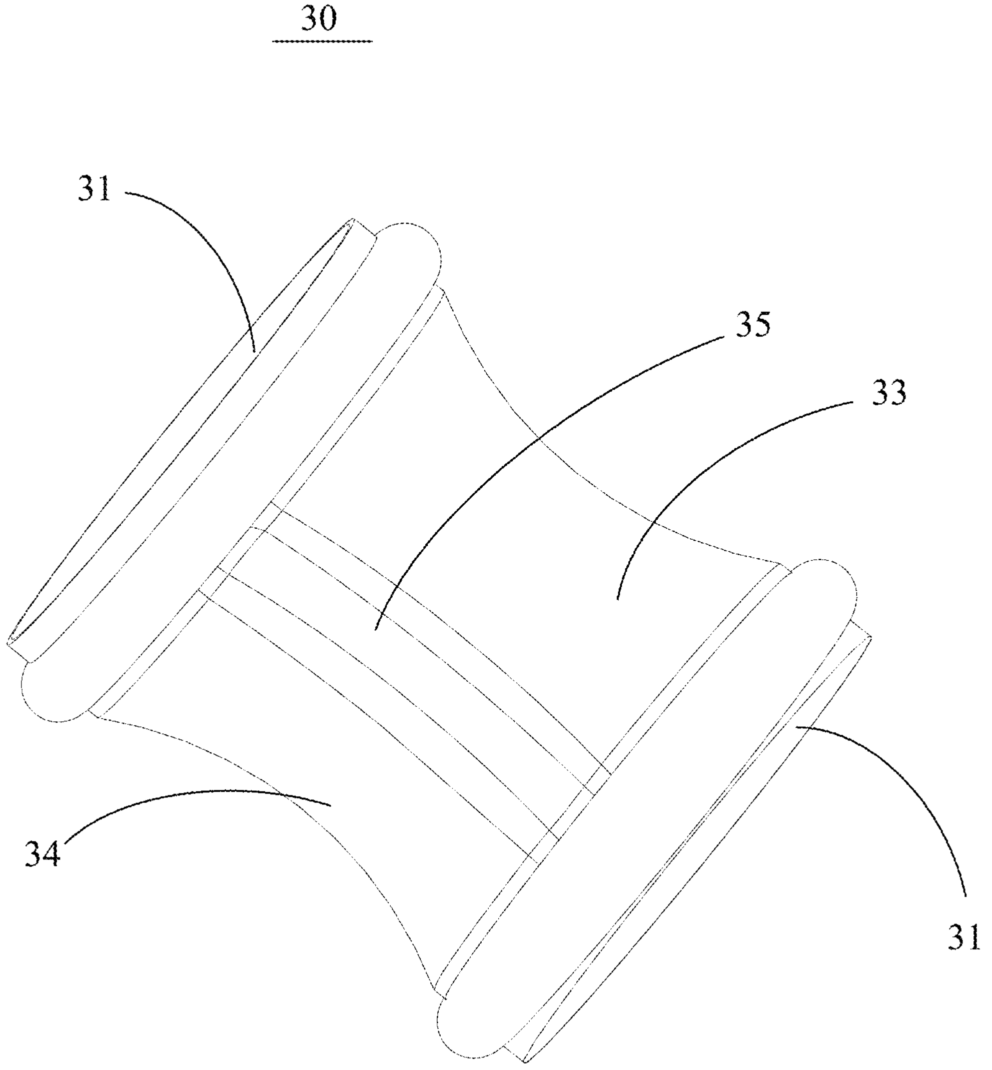
FIG. 5 is a schematic structural diagram of a cone paper of the loudspeaker according to this disclosure.

In the embodiment of this disclosure, the cone paper 30 may be arranged as an integrated structure. Specifically, referring to FIG. 5, the cone paper 30 has a certain elastic deformation space, and the voice coil assembly 50 drives the cone paper 30 to elastically deform when moving. During the process of extending or squeezing, the cone paper 30 realizes vibration.

Further, in order to increase the vibration amplitude of the cone paper 30 and improve the sound generating effect of the loudspeaker 1, the cone paper 30 includes a first wrapping surface 33 and a second wrapping surface 34, the first wrapping surface 33 and the second wrapping surface 34 are oppositely arranged, and edges of the first wrapping surface 33 and the second wrapping surface 34 are connected by an elastic edge 35 to wrap and enclose the accommodating cavity 32.

The first wrapping surface 33 and the second wrapping surface 34 of the cone paper 30 wrap and enclose the accommodating cavity 32, edges of the first wrapping surface 33 and the second wrapping surface 34 are connected by the elastic edge 35, and the elastic edge 35 provides displacement margin for the cone paper 30, so that the cone paper 30 can expand and contract.

Optionally, the elastic edge 35 is a rubber edge. The elastic edge 35 is an arc-shaped connecting member recessed from an outer surface of the cone paper 30 facing the accommodating cavity 32. The engaging slots 511 on the bobbin 51 of the first voice coil 52 and the bobbin 51 of the second voice coil 53 are engaged on the elastic edge 35 and bonded to the elastic edge 35. When the voice coil assembly 50 moves, the elastic edge 35 of the cone paper 30 is driven to move by the bobbin 51, and the elastic edge 35 drives the cone paper 30 to expand and contract.

In a further embodiment, a circumference of the outer surface of the cone paper 30 decreases from the openings 31 at both ends to a middle position of the cone paper 30, forming a drum-shaped cone paper 30 which is concave in the middle and convex at openings 31 at both ends. The first basket 10 and the second basket 20 are arranged at the openings 31 at both ends of the cone paper 30. The diffusion effect of the sound wave radiated by the drum-shaped loudspeaker is better, which improves the sound quality of circumferential non-directional loudspeakers.

Optionally, the cone paper 30 of the present embodiment is in a cylindrical shape, so that the loudspeaker 1 of the present embodiment is arranged in a cylindrical shape and has an aesthetical appearance.

Figure 7:
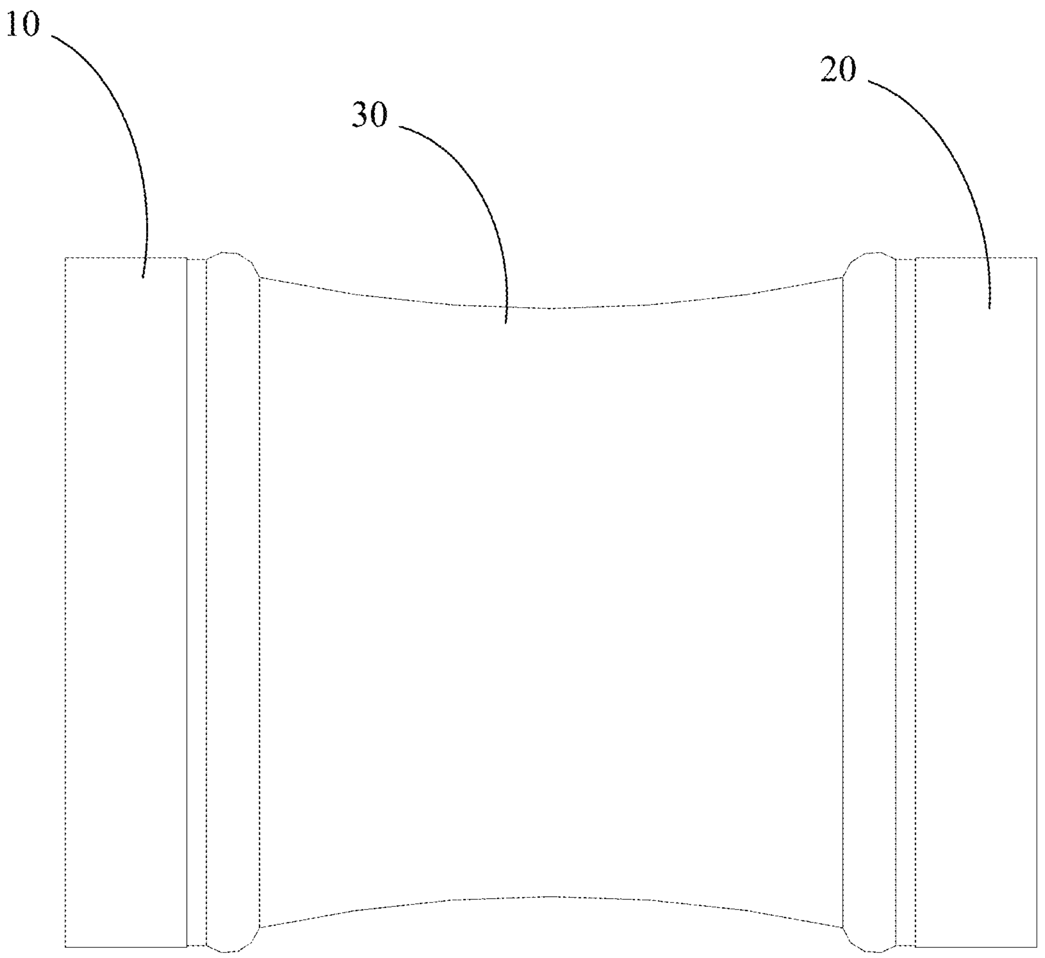
FIG. 7 is a schematic front view of the loudspeaker according to another embodiment of this disclosure.

In another embodiment, referring to FIG. 7, the loudspeaker 1 is in a square shape, and the cone paper 30 is in a square shape. It can be understood that the structure of the loudspeaker 1 in this embodiment is the same as that of the loudspeaker 1 in the above embodiments, except that each structure of the loudspeaker 1 in the above embodiments is arranged into a cylindrical shape with the structure of the cone paper 30, while each structure of the loudspeaker 1 in this embodiment is arranged into a rectangular tube type with the structure of the cone paper 30, and the beneficial effect is consistent with that of the above-mentioned cylindrical loudspeaker 1, which will not be repeated here.

Figure 8:
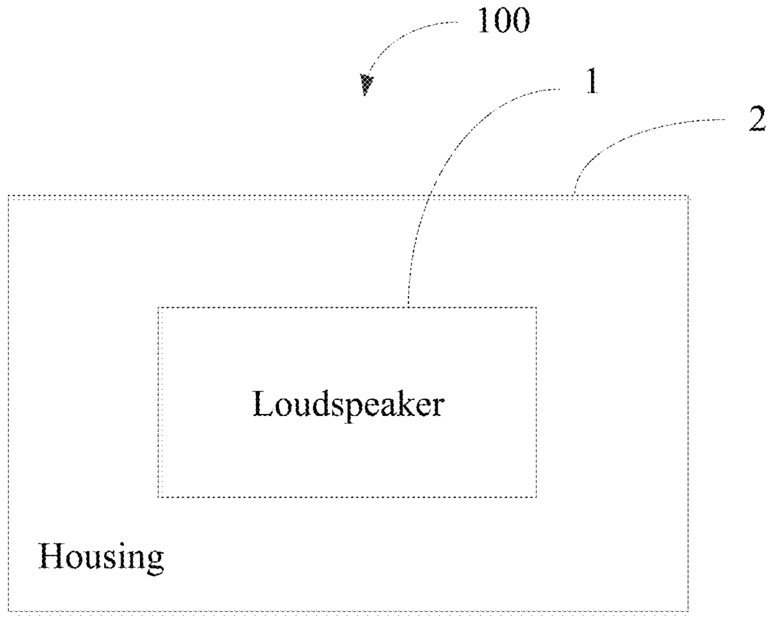
FIG. 8 is a schematic structural diagram of a loudspeaker device according to an embodiment of this disclosure.

Further, referring to FIG. 8, this disclosure further provides a loudspeaker device 100, which includes a housing 2 and a loudspeaker 1 arranged on the housing 2, and the loudspeaker 1 includes at least one of the above embodiments, for example, the loudspeaker 1 includes a first basket 10, a second basket 20, a cone paper 30, a magnetic circuit structure 40, and a voice coil assembly 50. The first basket 10, the cone paper 30, and the second basket 20 are combined to enclose a mounting cavity configured to accommodate the magnetic circuit structure 40 and the voice coil assembly 50.

Specifically, the cone paper 30 is configured to enclose an accommodating cavity 32 with openings 31 at both ends, and the openings 31 at both ends of the cone paper 30 are respectively provided with the first basket 10 and the second basket 20. That is, the openings 31 at both ends of the cone paper 30 are respectively mounted with the first basket 10 and the second basket 20, and the first basket 10, the cone paper 30 and the second basket 20 are assembled to form the mounting cavity.

The magnetic circuit structure 40 and the voice coil assembly 50 are located in the accommodating cavity 32. The voice coil assembly 50 is installed between the magnetic circuit structure 40 and an inner wall of the accommodating cavity 32 of the cone paper 30, and the voice coil assembly 50 is connected to the inner wall of the accommodating cavity 32 of the cone paper 30. The voice coil assembly 50 is configured to move under an action of a magnetic field of the magnetic circuit structure 40 to drive the cone paper 30 to vibrate.

Based on the fact that the loudspeaker has a circumferentially non-directional radiation sound and does not affect high-frequency audio, the loudspeaker device in this embodiment also has the beneficial effect of the loudspeaker, which will not be repeated here.

The above is only preferable embodiments of the present disclosure, and thus does not limit the scope of the present disclosure, and the equivalent structural transformation made by the content of the specification and the drawings of the present disclosure, or directly/indirectly applied to other related technical fields are all included in the patent protection scope of the present disclosure.

What is claimed is:

1. A loudspeaker, comprising:
- a first basket;
- a second basket;
- a cone paper enclosing an accommodating cavity with openings at both ends, the openings at both ends of the cone paper being respectively provided with the first basket and the second basket;
- a magnetic circuit structure located in the accommodating cavity; and
- a voice coil assembly located in the accommodating cavity, installed between the magnetic circuit structure and an inner wall of the accommodating cavity of the cone paper, and connected to the inner wall of the accommodating cavity of the cone paper, the voice coil assembly being configured to move under an action of a magnetic field of the magnetic circuit structure to drive the cone paper to vibrate,
- wherein the cone paper comprises:
  - a first wrapping surface; and
  - a second wrapping surface; wherein:
  - the first wrapping surface and the second wrapping surface are combined to form the accommodating cavity, and the first wrapping surface and the second wrapping surface are connected by an elastic edge.

2. The loudspeaker of claim 1, wherein the voice coil assembly comprises:
- a first voice coil; and
- a second voice coil; wherein:
- the first voice coil and the second voice coil are arranged between the openings at both ends of the accommodating cavity and are connected by winding, and windings of the first voice coil and the second voice coil are wound in opposite directions.

3. The loudspeaker of claim 2, wherein a bobbin of the first voice coil and a bobbin of the second voice coil are connected to an inner wall of the cone paper.

4. The loudspeaker of claim 2, wherein the magnetic circuit structure comprises:
- a first magnet;
- a first washer; and
- a second magnet; wherein:
- the first magnet, the first washer, and the second magnet are sequentially arranged in a direction of the first basket toward the second basket to form the magnetic circuit structure.

5. The loudspeaker of claim 3, wherein the magnetic circuit structure comprises:
- a first magnet;
- a first washer; and
- a second magnet; wherein:

the first magnet, the first washer, and the second magnet are sequentially arranged in a direction of the first basket toward the second basket to form the magnetic circuit structure.

6. The loudspeaker of claim 4, wherein the magnetic circuit structure further comprises:

a second washer; and a third magnet; wherein:

the second washer and the third magnet are sequentially arranged between the second magnet and the second basket.

7. The loudspeaker of claim 6, wherein the first voice coil is disposed between the first washer and the inner wall of the accommodating cavity of the cone paper, and the second voice coil is disposed between the second washer and the inner wall of the accommodating cavity of the cone paper.

8. The loudspeaker of claim 1, wherein a circumference of an outer surface of the cone paper is configured to decrease from the openings at both ends to a middle position of the cone paper.

9. The loudspeaker of claim 1, wherein the cone paper has a cylindrical shape or a square cylindrical shape.

10. The loudspeaker device of claim 1, wherein the cone paper has a cylindrical shape or a square cylindrical shape.

11. A loudspeaker device, comprising a housing and the loudspeaker as recited in claim 1 disposed on the housing.

12. The loudspeaker device of claim 11, wherein the voice coil assembly comprises:

a first voice coil; and a second voice coil; wherein:

the first voice coil and the second voice coil are arranged between the openings at both ends of the accommodating cavity and are connected by winding, and windings of the first voice coil and the second voice coil are wound in opposite directions.

13. The loudspeaker device of claim 12, wherein a bobbin of the first voice coil and a bobbin of the second voice coil are connected to an inner wall of the cone paper.

14. The loudspeaker device of claim 12, wherein the magnetic circuit structure comprises:

a first magnet;

a first washer; and a second magnet; wherein:

the first magnet, the first washer, and the second magnet are sequentially arranged in a direction of the first basket toward the second basket to form the magnetic circuit structure.

15. The loudspeaker device of claim 13, wherein the magnetic circuit structure comprises:

a first magnet;

a first washer; and a second magnet; wherein:

the first magnet, the first washer, and the second magnet are sequentially arranged in a direction of the first basket toward the second basket to form the magnetic circuit structure.

16. The loudspeaker device of claim 14, wherein the magnetic circuit structure further comprises:

a second washer; and a third magnet; wherein:

the second washer and the third magnet are sequentially arranged between the second magnet and the second basket.

17. The loudspeaker device of claim 16, wherein the first voice coil is disposed between the first washer and the inner wall of the accommodating cavity of the cone paper, and the second voice coil is disposed between the second washer and the inner wall of the accommodating cavity of the cone paper.

18. The loudspeaker device of claim 11, wherein the cone paper comprises:

a first wrapping surface; and a second wrapping surface; wherein:

the first wrapping surface and the second wrapping surface are wound to form the accommodating cavity, and the first wrapping surface and the second wrapping surface are connected by an elastic edge.

19. The loudspeaker device of claim 18, wherein a circumference of an outer surface of the cone paper is configured to decrease from the openings at both ends to a middle position of the cone paper.

* * * * *